Figure 1:
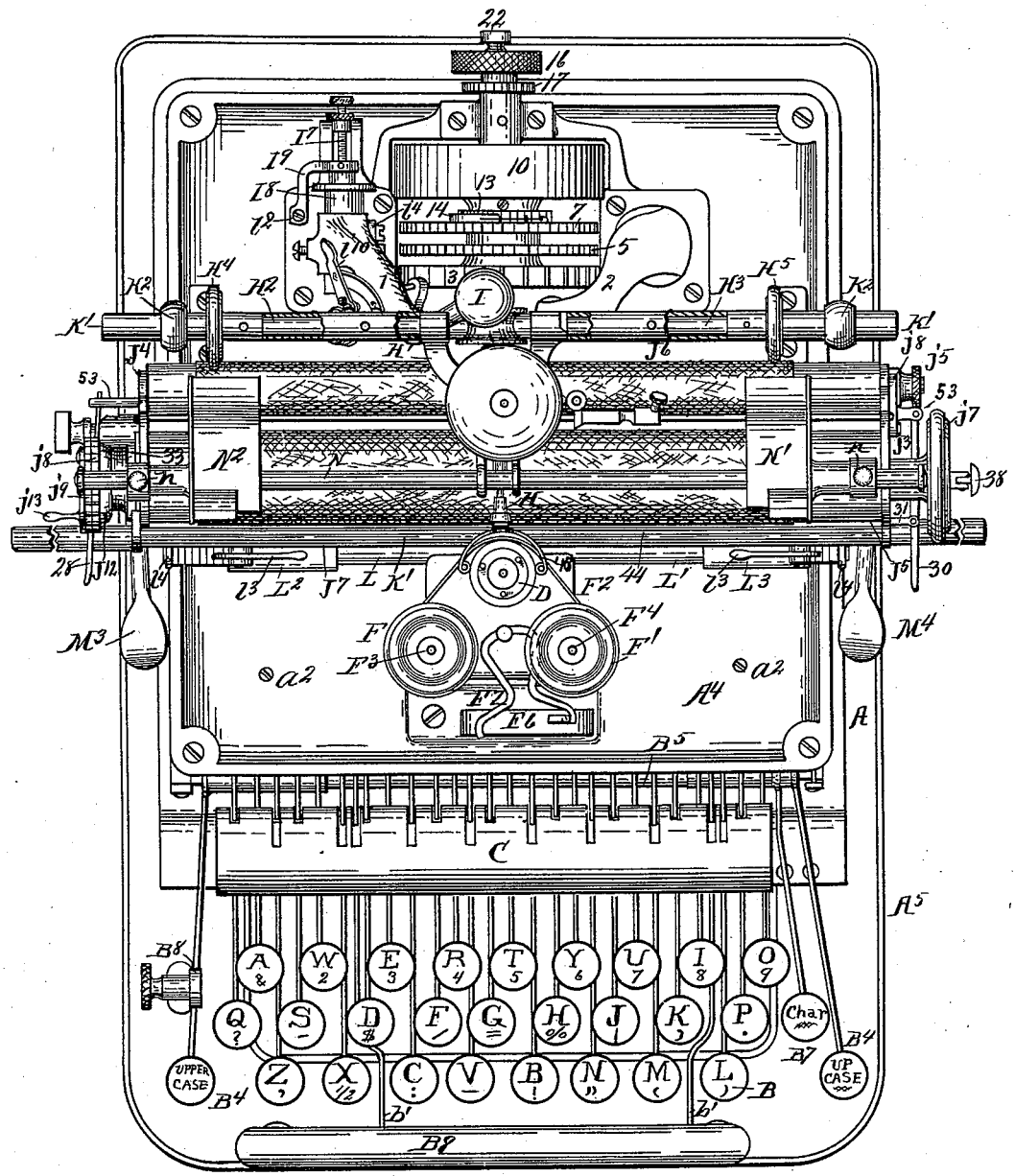

(No Model.) 11 Sheets—Sheet 1.

W. FREDRICK, C. H. NORTON & R. J. SIMPSON.
TYPE WRITER.

No. 579,941. Patented Mar. 30, 1897.

WITNESSES
INVENTORS
William Fredrick
Charles H. Norton
Robert J. Simpson
By their Attorney
Newell S. Wright

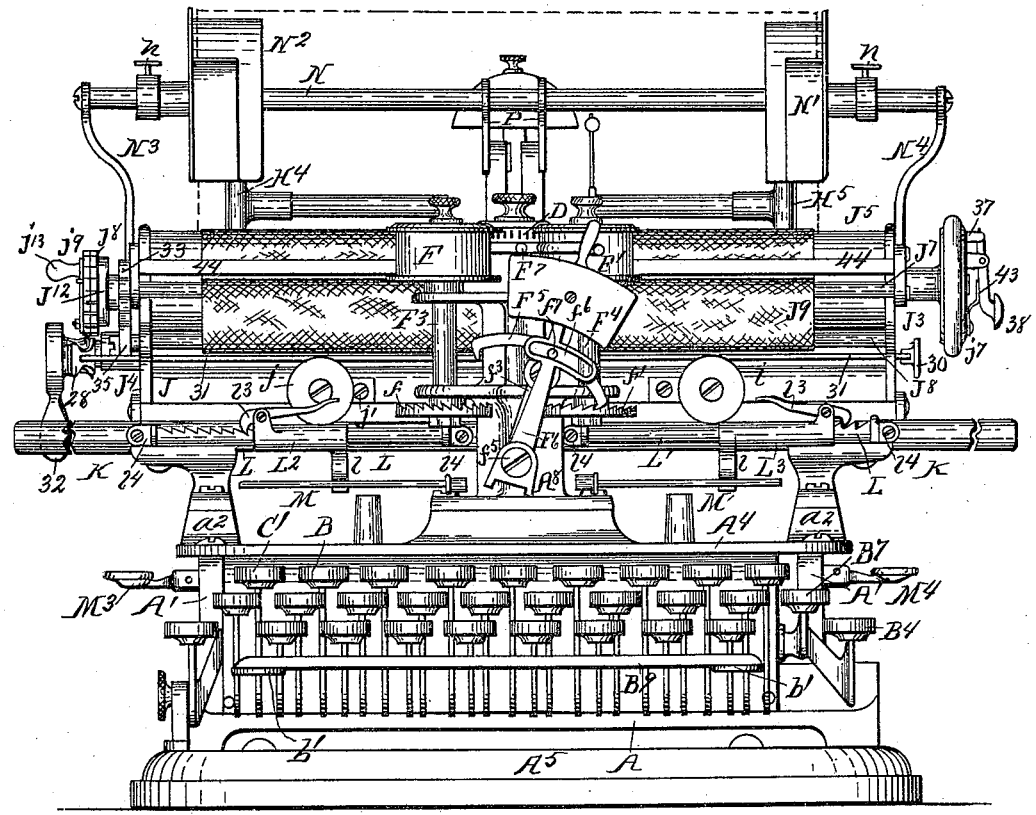

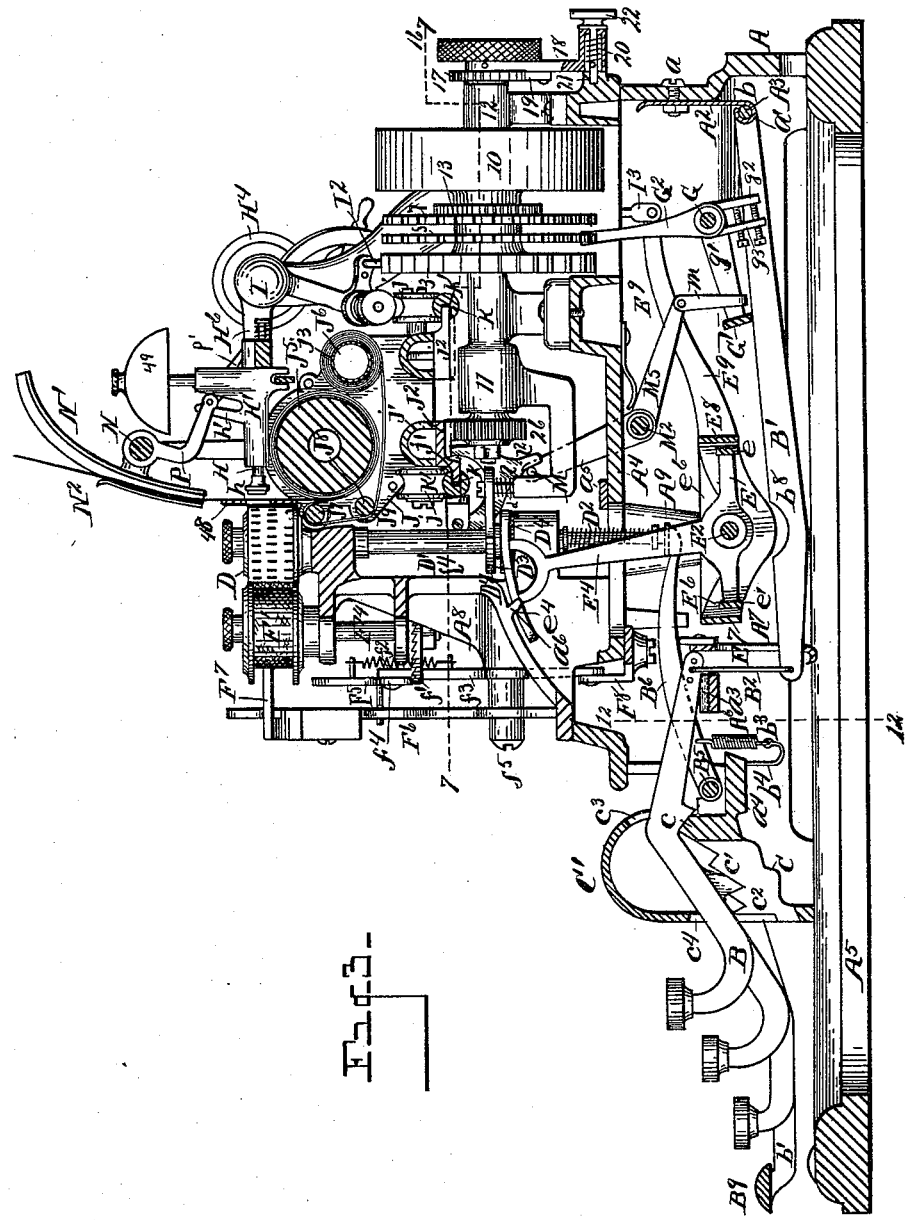

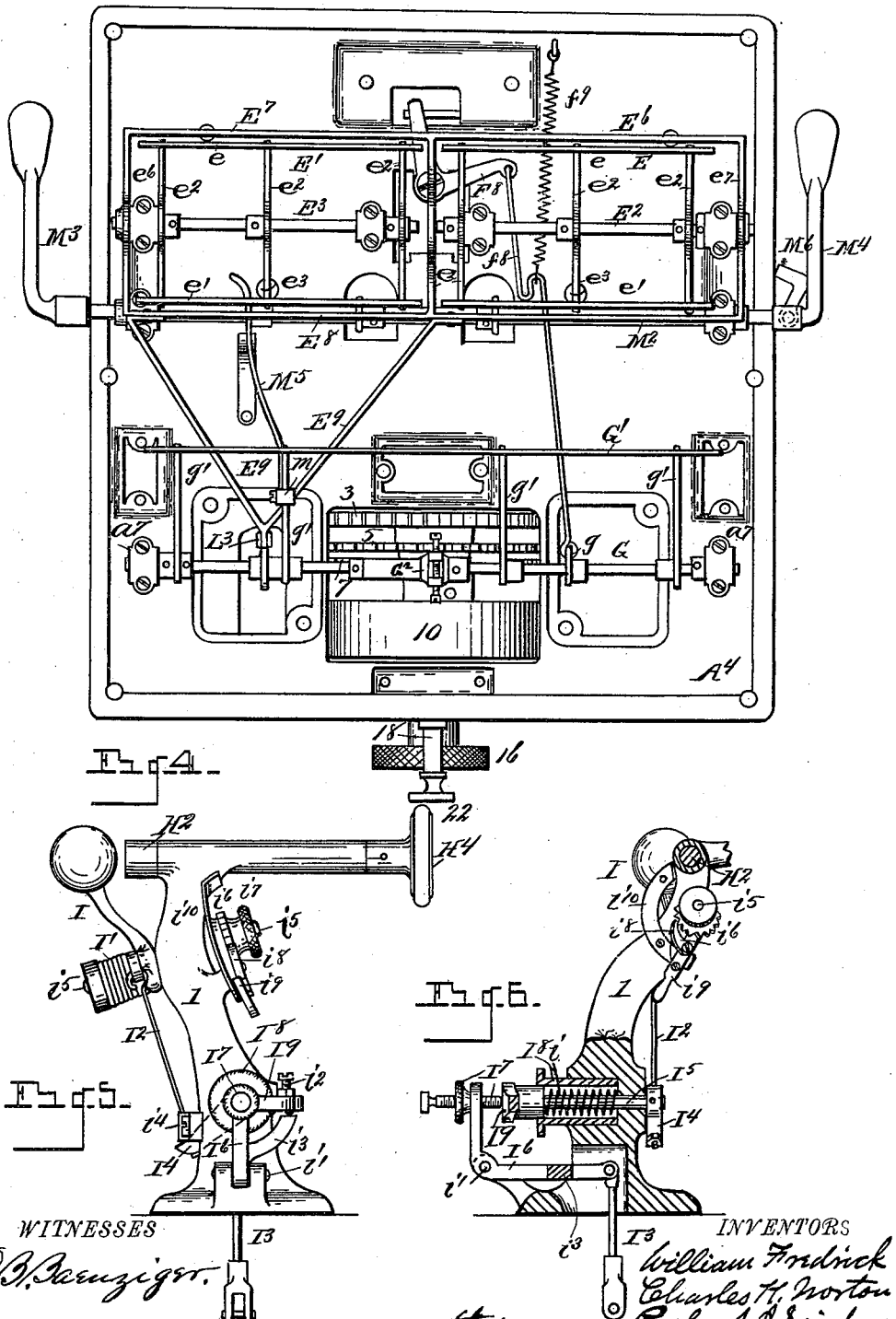

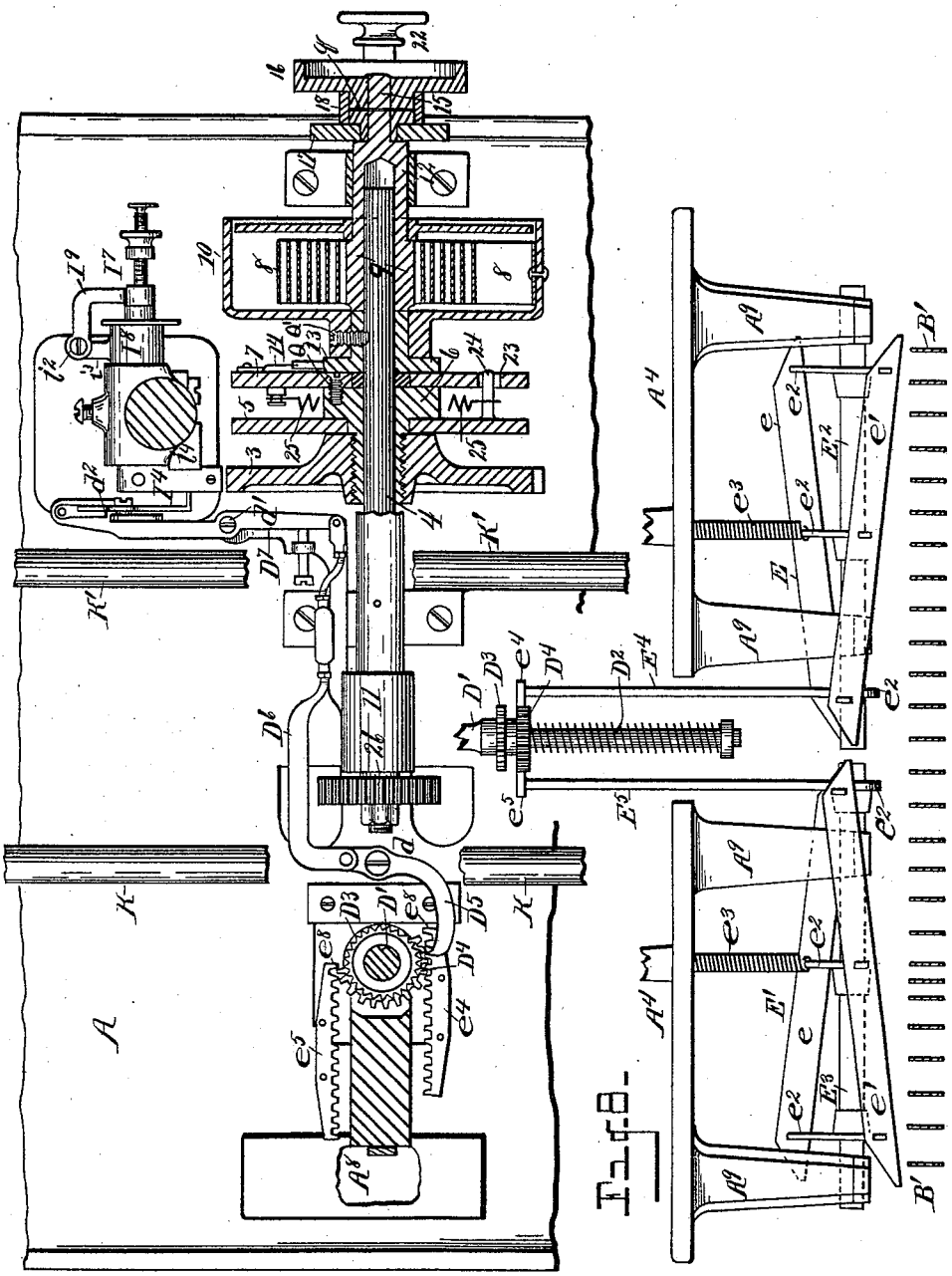

(No Model.) 11 Sheets—Sheet 6.
W. FREDRICK, C. H. NORTON & R. J. SIMPSON.
TYPE WRITER.
No. 579,941. Patented Mar. 30, 1897.
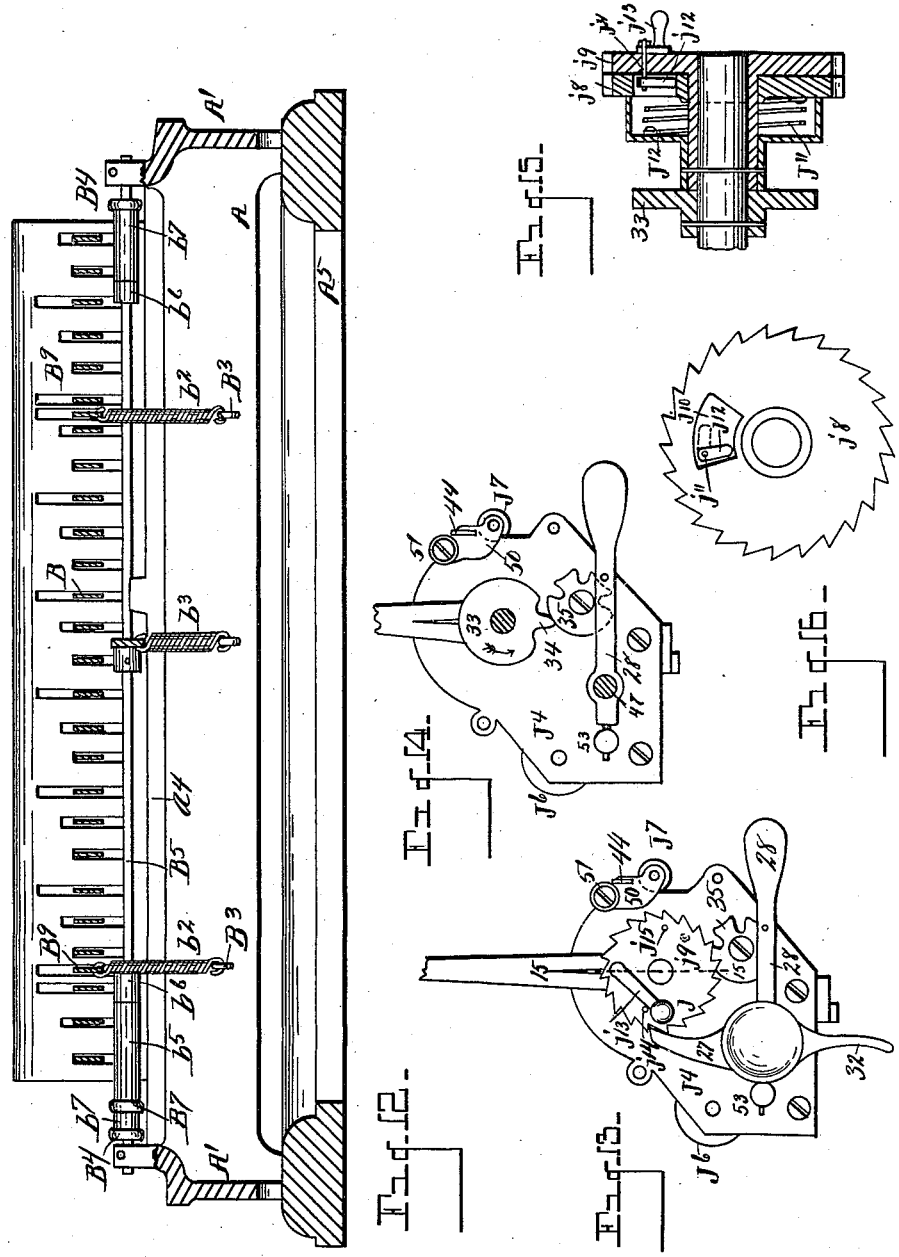
WITNESSES
INVENTORS
William Fredrick
Charles H. Norton
Robert J. Simpson
By their Attorney
Newell S. Wright

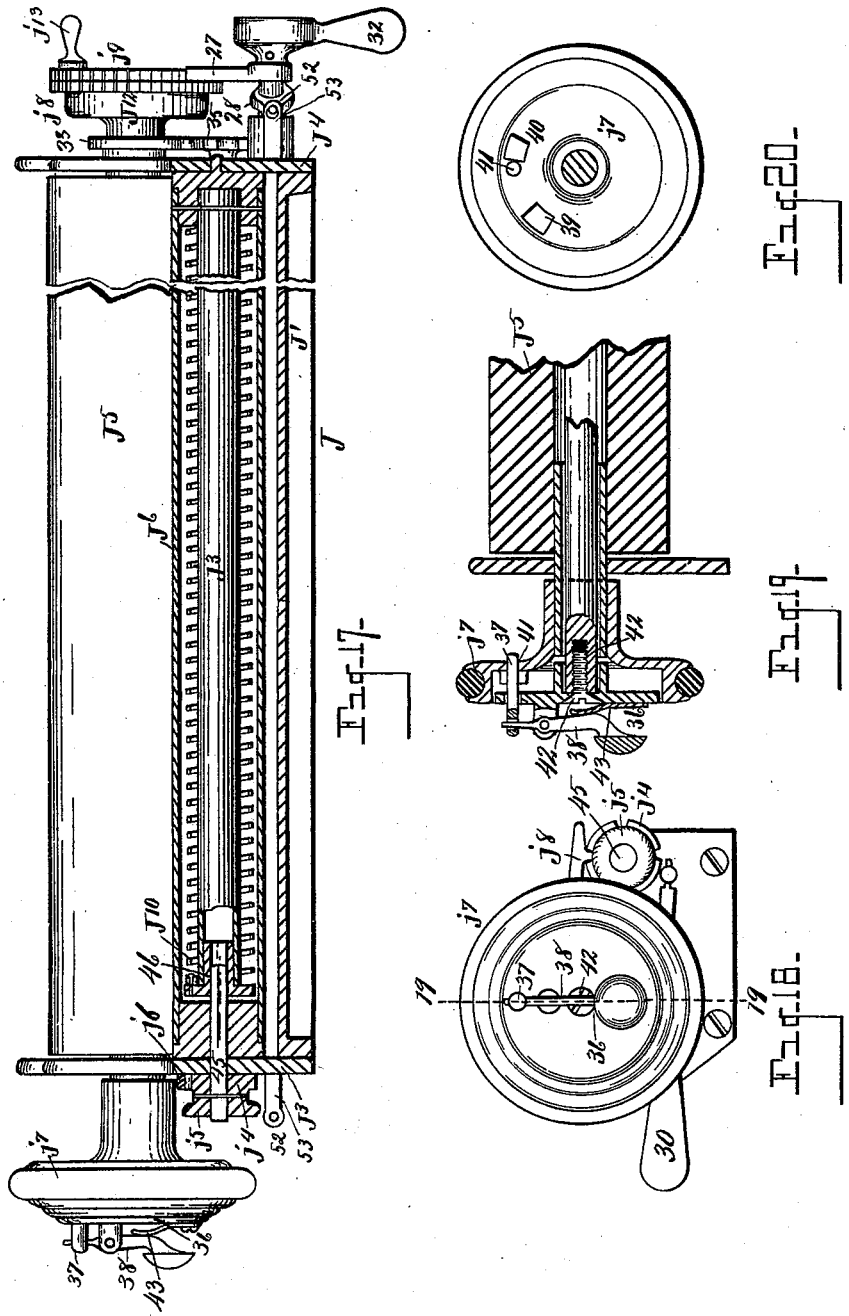

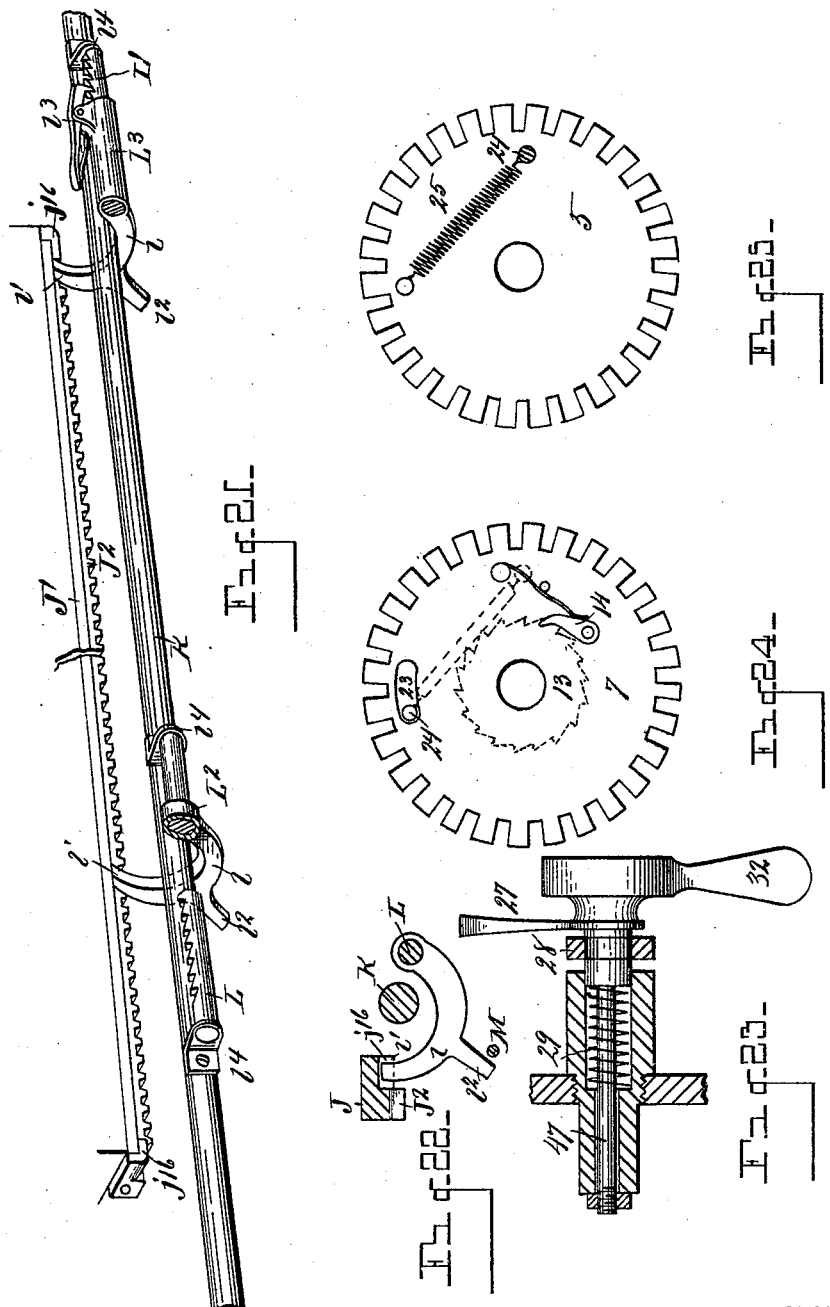

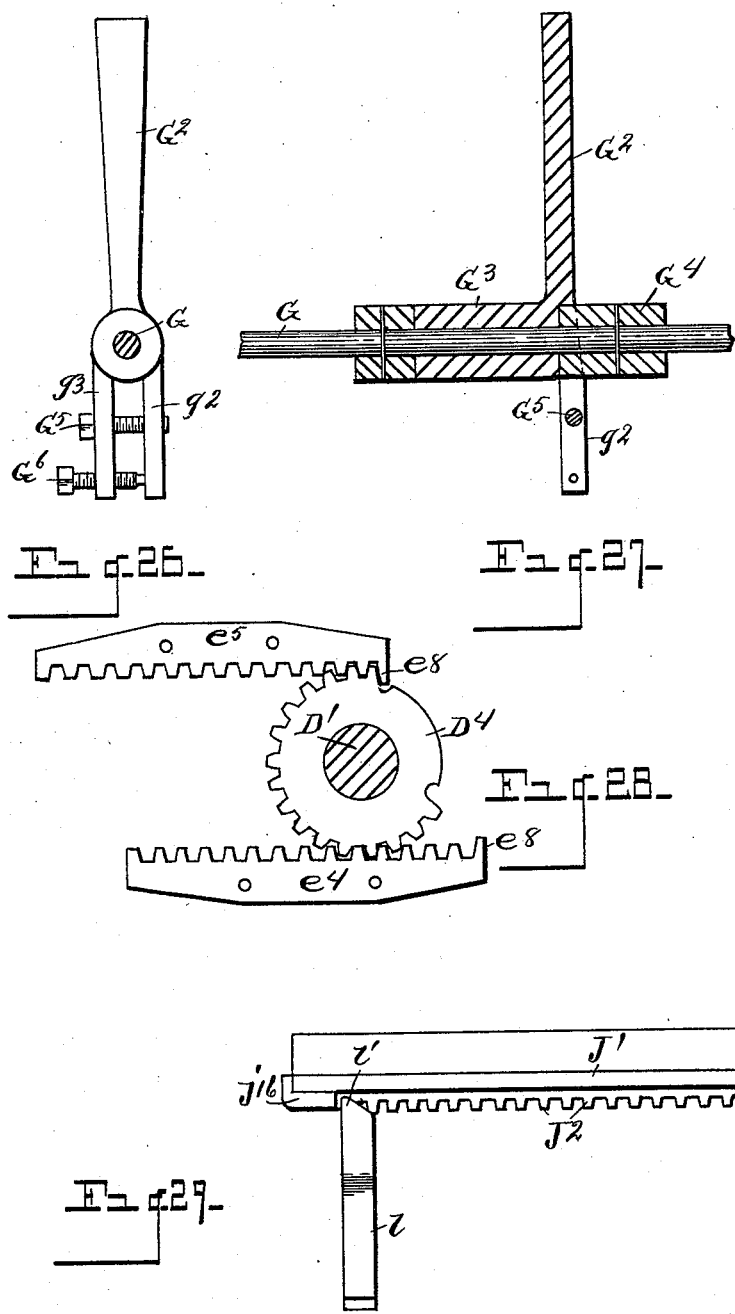

(No Model.) 11 Sheets—Sheet 10.
W. FREDRICK, C. H. NORTON & R. J. SIMPSON.
TYPE WRITER.
No. 579,941. Patented Mar. 30, 1897.
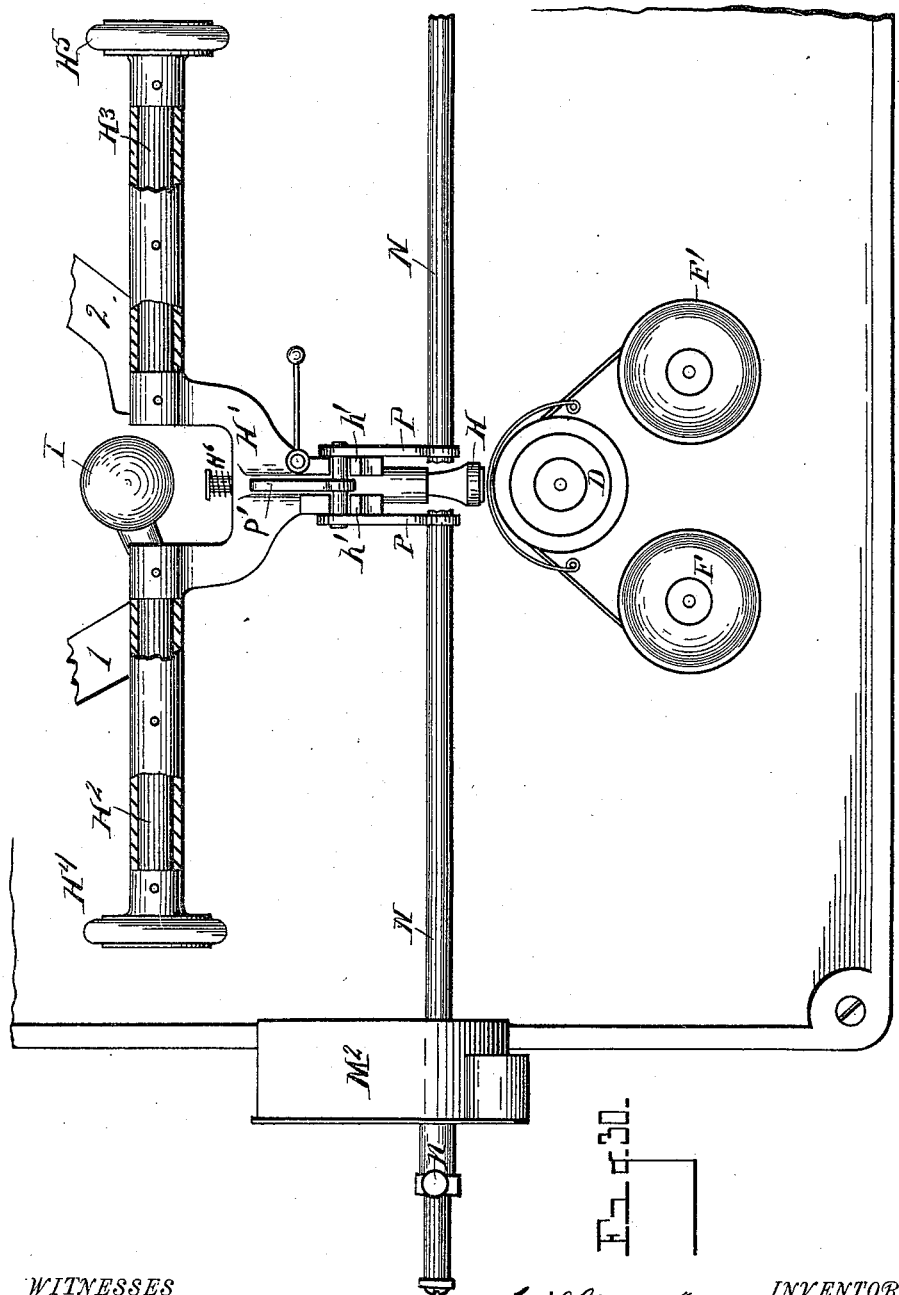
WITNESSES
INVENTORS (No Model.) 11 Sheets—Sheet 11.
W. FREDRICK, C. H. NORTON & R. J. SIMPSON.
TYPE WRITER.
No. 579,941. Patented Mar. 30, 1897.
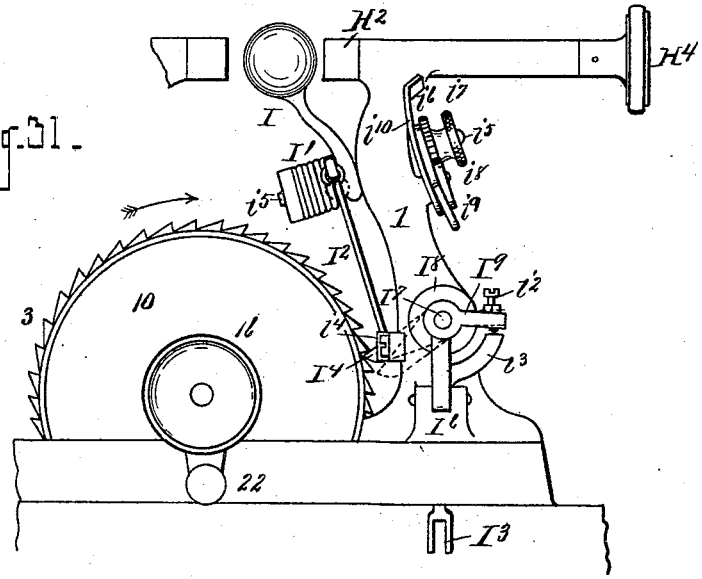
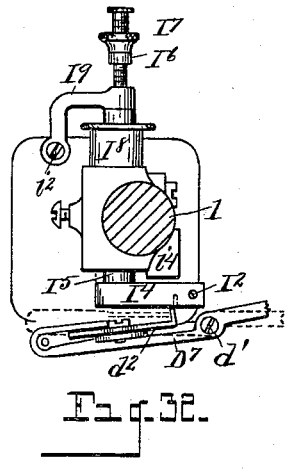
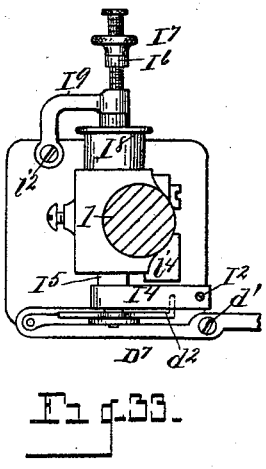
WITNESSES
INVENTORS
William Fredrick
Charles H. Norton
Robert J. Simpson
By Attorney

UNITED STATES PATENT OFFICE.

WILLIAM FREDRICK, OF CLYDE, OHIO, AND CHARLES H. NORTON AND ROBERT J. SIMPSON, OF DETROIT, MICHIGAN, ASSIGNORS TO THE LELAND & FAULCONER MANUFACTURING COMPANY, OF DETROIT, MICHIGAN.

TYPE-WRITER.

SPECIFICATION forming part of Letters Patent No. 579,941, dated March 30, 1897.

Application filed August 19, 1895. Serial No. 559,735. (No model.)

*To all whom it may concern:*

Be it known that we, WILLIAM FREDRICK, residing at Clyde, in the county of Sandusky and State of Ohio, and CHARLES H. NORTON and ROBERT J. SIMPSON, residing at Detroit, county of Wayne, State of Michigan, citizens of the United States, have invented a certain new and useful Improvement in Type-Writers; and we declare the following to be a full, clear, and exact description of the invention, such as will enable others skilled in the art to which it appertains to make and use the same, reference being had to the accompanying drawings, which form a part of this specification.

Our invention is designed to provide certain new and useful improvements in typewriters, and more especially relates to that class of type-writers known as "type-wheel" machines.

Our invention has for its objects a machine of this character of superior efficiency, simplicity, economy, durability, and utility; and it consists of the structure, combination, and arrangement of parts hereinafter described and claimed, and illustrated in the drawings, in which—

Figure 1 is a plan view. Fig. 2 is a front elevation. Fig. 3 is a central vertical section showing parts in elevation. Fig. 4 is an inverted plan of the cover-plate, showing certain portions of the mechanism attached thereto and projecting therethrough. Fig. 5 is a detail view, in rear elevation, showing features of the hammer-operating mechanism. Fig. 6 is a view of the same, partly in side elevation and partly in vertical section. Fig. 7 is a horizontal section on the line 7 7, Fig. 3. Fig. 8 is a view in front elevation and vertical section showing the rocking frames. Fig. 9 is a detail view showing a portion of the oscillatory bar $B^5$ with the sleeves thereupon. Fig. 10 is a longitudinal section of the same. Fig. 11 is a view similar to Fig. 9, but showing part of the outer sleeve broken away. Fig. 12 is a vertical section on the line 12 12, Fig. 3. Fig. 13 is a side elevation of the carriage. Fig. 14 is a similar view, partly in section, the ratchet-wheel and pawl of Fig. 13 being removed. Fig. 15 is a vertical section on the line 15 15, Fig. 13. Fig. 16 is an inner side elevation of the inner ratchet on the shaft of the roller. Fig. 17 is a horizontal section through the spring-roller, showing the carriage in the rear thereof in plan. Fig. 18 is an elevation of the opposite end of the carriage. Fig. 19 is a section on the line 19 19, Fig. 18. Fig. 20 is an elevation of the wheel shown in Fig. 18, the disk on the shaft of the roller being removed. Fig. 21 is a detail view in perspective showing the rack-bar and arm 1. Fig. 22 is a cross-section of Fig. 21. Fig. 23 is a longitudinal section showing the spring 29. Fig. 24 is a detail view of the wheel 7. Fig. 25 is a detail view of the wheel 5. Fig. 26 is a detail view of the pawl $G^2$. Fig. 27 is a longitudinal vertical section thereof. Fig. 28 is an enlarged detail view of the rack-bars $e^4$ $e^5$ and related parts. Fig. 29 is a detail view of one end of the rack-bar $J^2$. Fig. 30 is a plan view showing certain parts of the machine. Fig. 31 is a partial rear elevation. Fig. 32 is a detail view showing the pawl $I^4$ in position to actuate the operating-bar $D^7$. Fig. 33 is a similar view, but showing the bar $D^7$ returned to normal position, bringing the pawl $d^2$ underneath the pawl $I^4$ before said latter pawl has returned to normal position.

A represents the main frame of the machine, A' denoting the side plates thereof.

B indicates various keys, and B' corresponding levers connected with the individual keys, respectively, by links or rods $B^2$. The levers are jointedly supported at their rear ends upon the frame in any suitable manner, as indicated, for example, at $b$.

As shown, a supporting-plate $A^2$ is engaged upon the rear of the frame, as by bolts $a$, the lower edge of said plate being turned to form a tubular orifice, (shown at $a'$,) in which is located a pivoting-rod $A^3$, upon which the rear ends of said levers are engaged. By this arrangement it will be evident that the operation of the keys causes an upward action of the levers B' upon the mechanism thereabove actuated thereby.

$A^4$ is a cover-plate having a removable engagement with the main frame, as shown, the said plate being held upon said frame in any suitable manner, as by screws $a^2$.

$A^5$ is a supporting-base for the main frame.

The keys B are preferably arranged in three transverse rows and are fulcrumed upon a stepped plate C, engaged with the frame A. The keys of the upper row are thus fulcrumed upon the upper step $c$, the next row of keys being fulcrumed upon the second step $c'$, while the keys of the lower row are fulcrumed upon the lower step $c^2$.

$C'$ is a housing located above the stepped plate covering the keys thereabove, said housing being slotted on each side, as shown at $c^3$ and $c^4$, for the passage of the keys, said slots serving also as guides for the keys as they are manipulated.

$A^6$ is a cross-bar of the main frame limiting the downward movement of the rear ends of the keys and holding the forward extremities of the keys in horizontal alinement. This cross-bar is preferably cushioned by a suitable covering $a^3$.

$A^7$ is a slotted plate through which the forward ends of the levers $B'$ project, said slots serving as guides for said levers.

$B^9$ denotes the spacer key or bar, provided with arms $b'$, fulcrumed upon the stepped plate C, one of said arms having a link connection with a corresponding lever $B'$. To restore the spacer-key to normal position, we provide springs $b^2$, Fig. 12, engaged with each of said arms, hooks $B^3$ engaging the opposite ends of said springs, said hooks being supported upon a cross-bar $a^4$ of the main frame.

$B^4$ represents keys for raising the type-wheel, to be hereinafter described, into position to use the upper-case letters, there being one of these upper-case keys on each side of the keyboard. At their inner ends these upper-case keys are engaged with sleeves $b^7$ (see Figs. 9, 10, 11, and 12) upon an oscillatory bar $B^5$, provided with an arm $B^6$, upon which rests the shaft of the type-wheel. A spring $b^3$, engaged with said arm, restores the arms with the upper-case keys to normal position. A hook $b^4$, supported upon the cross-bar $a^4$, engages the lower end of said spring.

$B^7$ is a key for raising the type-wheel into position for the use of numerals, punctuation-marks, or other characters. This character-key $B^7$ is connected at its forward end with an outer sleeve $b^5$ upon the bar $B^5$, said bar being also provided with collars $b^6$, rigidly engaged therewith, the sleeves and collars being so constructed that at a given point in the movement of the keys $B^4$ and $B^7$ the respective sleeves will clutch the adjacent collar and oscillate the bar $B^5$. The keys $B^4$ are arranged to have a limited downward stroke to lift the upper case on the type-wheel into proper position, while the character-key $B^7$ is arranged to have a further downward stroke for the purpose of lifting the type-wheel still higher to bring the numerals or other characters into proper position.

$B^8$ is a rotatable cam to lock the adjacent upper-case key $B^4$ in downward position to hold the upper case of the type-wheel in operative position.

D represents a rotatable type-wheel, and $D'$ is a shaft projecting downward through the cover-plate and resting on the end of the arm $B^6$. $D^2$ is a retracting-spring upon said shaft. $D^3$ is a pinion on said shaft, and $D^4$ a segmental rack-bar on the shaft.

The type-wheel shaft is journaled in an upwardly-projecting bracket-arm $A^8$ on the cover-plate and made vertically adjustable.

E and $E'$ represent rocking frames mounted, respectively, upon rocking shafts $E^2$ and $E^3$, each of said frames being provided with side bars $e$ $e'$, oppositely inclined, said side bars being connected with the corresponding shaft by cross-bars $e^2$. These frames E $E'$ and their respective shafts are located end to end and separated at their adjacent ends, as shown, each frame operating independently of the other. Said frames are located above the levers $B'$, said levers when raised by the depression of the corresponding key engaging with said frames, the levers $B'$ being preferably cut away, as shown at $b^8$, to admit the shafts of said frames when the levers are in raised position. The raising of the levers $B'$, respectively, gives a rocking movement to the corresponding frames, the frames being restored to normal position by springs $e^3$ when free to retract. The side bars $e$ $e'$ are constructed to give the individual levers $B'$ the amount of travel or throw required to move the type-wheel in position for the corresponding character.

The angle of the frames E and $E'$, it will be obvious, must be very accurate on both sides thereof, so that when a given lever $B'$ is lifted it will first come into contact with the front side bar $e'$ of the corresponding frame and bring up at the limit of its stroke on the rear side bar $e$, thereby bringing the type-wheel into the right position and holding the type-wheel in said position as long as the corresponding key is kept down.

It will be evident that when the lever $B'$ strikes both the front and rear side bars of the corresponding frame it has reached the limit of its movement.

There is obviously great advantage in making the two rocking frames separated at their adjacent ends over making a single frame the same length as the two frames put together, inasmuch as by making two such frames we are enabled to secure more readily the required throw to each of the levers $B'$, this construction permitting of a greater difference of action between the various levers and thus giving more time for tripping the hammer and striking the right letter. Said shafts are provided with oscillatory arms $E^4$ and $E^5$, respectively, said arms having rack-bars $e^4$ and $e^5$ at their upper ends meshing with the segmental rack-bar $D^4$ upon the shaft of the type-wheel, whereby the type-wheel is rotated into required position. The shafts $E^2$ $E^3$ are journaled in suitable brackets $A^9$, depending from the cover-plate. The arms $E^4$ $E^5$ project upward through the cover-plate and are limited in their stroke by a stop-bar $a^5$, having an adjustable engagement upon the cover-plate. The rack-bars $e^4$ $e^5$ are held from any liability of lateral disengagement from the rack-bar $D^4$ by lugs $a^6$ on the bracket $A^8$.

F and F' are spools upon which is wound the ribbon $F^2$, which, intermediate the spools, passes about the type-wheel. These spools are mounted upon shafts $F^3$ and $F^4$, provided with ratchet-wheels $f$ and $f'$, the ratchet-teeth preferably standing upward at the periphery thereof, as shown. These shafts are also journaled in the bracket $A^8$.

To shift the ribbons on the spools, we provide an oscillatory dog $F^5$, Figs. 2 and 3, arranged to alternately engage the two ratchet-wheels, a spring $f^2$ serving to hold the dog in engagement with one or another of said wheels. This dog has a pivotal engagement intermediate its ends upon an oscillatory standard $f^3$, as shown at $f^4$.

$F^6$ is a pendulum jointedly engaged at its lower end upon the bracket $A^8$, as at $f^5$, weighted at its upper end and constructed with an arc-shaped slot $f^6$, into which projects a pin $f^7$, engaged with the dog $F^5$.

$F^7$ is a horizontally-oscillatory fork to throw the pendulum.

The standard $f^3$ projects through the cover-plate and is engaged by one arm of a bell-crank lever $F^8$ on the under side of the cover-plate, the opposite arm of said lever being united by a connecting-rod $f^8$, Fig. 4, with an arm $g$ of a rock-shaft G, journaled in brackets $a^7$ on the under side of the cover-plate. The rock-shaft G is provided with a transverse wing or bar G', connected therewith by arms $g'$, the bar G' being located above the levers B' and actuated thereby to rock the shaft G. Consequently on the operation of a given key the standard $f^3$ is oscillated, whereby the dog $F^5$ rotates one of the ratchet-wheels $f$ $f'$ one notch, winding the ribbon on the corresponding spool. By throwing the pendulum over in one direction or the other the rotation of the spools is reversed. A spring $f^9$ retracts the bell-crank $F^8$ and consequently the dog $F^5$.

H, Figs. 1, 3, and 30, is a reciprocatory hammer to strike against the type-wheel to impress a given letter or character upon the intervening paper, said hammer being sleeved through an oscillatory yoke H', said yoke provided with journals $H^2$ and $H^3$, having their bearings in brackets (indicated by the numerals 1 and 2) supported upon the cover-plate. These journals at their extremities are provided with heads $H^4$ and $H^5$, whereby the hammer may be turned up out of the way and returned to normal position from either side of the machine.

$H^6$ is a spring to retract the hammer. The face $h$ of the hammer may be made of steel or rubber or any other suitable material. A trip-hammer I, constructed in the form of a bell-crank, is provided to strike the reciprocatory hammer H, said trip-hammer having an oscillatory engagement upon the bracket, (indicated by the numeral 1,) said bracket being provided with an arm upon which the latter hammer is fulcrumed.

I' is a spring exerting its tension upon the trip-hammer. With the rear end of the trip-hammer is engaged an operating-rod $I^2$.

$E^6$ indicates an oscillatory frame fulcrumed upon the shafts $E^2$ $E^3$, said frame being provided with side bars $E^7$ and $E^8$, engaged upon said shaft by end pieces $e^6$ $e^7$. This frame $E^6$ is constructed with a rearwardly-projecting arm $E^9$, with which is connected a rod $I^3$. The oscillatory frame $E^6$ is located about the rocking frames E E' and is actuated by the levers B'. The frame $E^6$, however, is so located and arranged with reference to the rocking frames E E' as to be actuated by a given lever B' after the actuation of either of the rocking frames by a given lever, the movement first imparted to the one of the rocking frames by a given lever first actuating the type-wheel to bring it into required position, a further impulse or movement of the said lever actuating the oscillatory frame and thereby the trip-hammer to impress the corresponding type or character upon the paper.

The rod $I^2$, Figs. 5 and 6, is engaged at its lower end with a crank-pawl $I^4$ upon a spindle $I^5$, sleeved in the bracket 1, said spindle provided with a retracting-spring $i$. The rod $I^3$ is connected with a bell-crank $I^6$, fulcrumed upon said bracket, as at $i'$. The opposite end of the bell-crank carries an adjustable screw or plunger $I^7$, arranged to strike against the end of said spindle and force it longitudinally forward when the bell-crank is operated, thereby forcing the crank-pawl out of engagement with a stop $i^4$, allowing the spring upon the trip-hammer to cause a blow of the trip-hammer upon the hammer H, the said crank-pawl $I^4$, being released from said stop, engaging a rotatable toothed wheel 3, by which it is returned to normal position, in the manner hereinafter described, in engagement with said stop to hold the hammer in retracted position.

$I^8$ is a thimble engaged in the bracket 1 to receive one end of the spindle and its retracting-spring.

$I^9$ is an arm on the end of the spindle provided with an adjusting-screw $i^2$ to contact with an arm $i^3$ upon the bell-crank $I^6$.

It will be obvious that when the rod $I^3$ is forced upward the arm $i^3$ of the bell-crank $I^6$ will be raised against the arm $I^9$ on the end of the spindle $I^5$, thereby giving a partial rotation to said spindle and throwing downward the outer end of the crank-pawl $I^4$.

It will be seen that whenever a letter is struck and the carriage is moved a step thereby the wheel 3 will strike the pawl $I^4$ and throw it down past the arm $i^4$ sufficiently to allow the spring $i$ to pull the pawl $I^4$ under the arm $i^4$, when the spring $I'$ will lift the pawl $I^4$ up snugly under the arm $i^4$ after it has been thus pulled therebeneath. In this lifted position the pawl $I^4$ projects sufficiently to be ticked or struck slightly by the wheel 3 in its step movement, but when the spindle $I^5$ is partially rotated by the upward movement of the rod $I^3$ the pawl $I^4$ is thrown down sufficiently to allow the wheel 3 to pass without ticking. This is not essential to the working of the machine, but simply to prevent the noise that would follow if the wheel 3 were allowed to thus tick the pawl $I^4$. The operation of the rod $I^3$ trips the hammer to strike the letters and also throws the arm $i^3$ upward sufficiently to turn the pawl $I^4$ down a required distance to prevent its being ticked by the wheel 3, as above stated.

The arm $i^4$ has a fixed engagement on the bracket 1 and holds the retracted crank-pawl thereunder until released by the movement of the spindle, as above described.

The trip-hammer is fulcrumed on a spindle $i^5$ in the bracket 1, upon which spindle is also located the spring $I'$. The opposite end of the spindle is provided with a ratchet-wheel $i^6$ and with a milled head $i^7$. A pawl $i^8$ engages said ratchet-wheel, the pawl being provided with an operating-lever $i^9$.

$i^{10}$ is a segmental bar adjacent to said lever arranged to hold the lever in position at the upper or lower ends thereof. In this manner it will be seen the tension of the spring $I'$ may readily be changed by turning the head $i^7$ or by shifting the lever $i^9$ to the upper or lower ends of the segmental bar $i^{10}$.

Upon the shaft 4 is mounted a hub 6, provided with a stem with which a toothed wheel 3 has a threaded engagement. A toothed wheel 5 is loosely mounted upon said hub. An additional toothed wheel 7 is mounted upon the shaft 4 and made fast to said hub 6, as by screws Q. Said wheel 7 is constructed with an arc-shaped slot 23, and the wheel 5 is provided with a spur or pin 24, extending into said slot, a spring 25 exerting its tension upon said pin. By this arrangement the wheel 5 is only permitted to move one space or step at a time, the wheel being moved back by said spring, one end of which is fastened to said pin and the other end thereof being secured to the wheel 7.

13 denotes a ratchet-wheel mounted upon the shaft 4.

9 represents a hub or sleeve upon the shaft 4, with which is connected a spring 8 within an inclosing case 10.

The ratchet-wheel 13 and the case 10 are united, as by screws Q' engaging the hubs of the ratchet-wheel and case. The wheel 7 is provided with a dog or pawl 14 to engage the ratchet-wheel 13 and preventing the retraction of the wheel 7 and the mechanism connected therewith. The hub 9 is provided with a shaft 15, connected with which is a milled head 16 and a ratchet-wheel 17. Upon the shaft 15 is loosely mounted a crank-arm 18, carrying a pawl 19, engaging the ratchet-wheel 17, said wheel being made fast to the hub of the head 16, said hub having a fixed engagement upon the shaft 15, as by a pin $q$.

Sleeved through the outer end of the crank-arm is a reciprocatory spring-stop 20, engaging in a retaining-socket 21.

It will be apparent that by turning the shaft 15 either by means of the milled head 16 or by means of the crank-arm 18 the tension of the spring 8 may readily be increased or diminished, as may be desired, and that the spring may be independently adjusted either by means of the milled head 16 or the crank-arm 18. When it is desired to rapidly adjust the tension of the spring 8, the stop 20 may be released from the socket 21, the stop being provided with a head 22, permitting the operator to rotate the crank-arm 18 to rapidly adjust the tension of the spring. The stop is then engaged in the socket 21, when, if required, a closer adjustment of the spring may be made by means of the milled head 16. The teeth upon the wheels 5 and 7 are spaced an equal distance from one another and are of equal size.

Upon the shaft G is located an oscillatory pawl $G^2$, engageable with the toothed wheels 5 and 7 upon alternate oscillations of said pawl. This pawl $G^2$, it will be understood from the description heretofore given, is thus operated by means of the levers B' engaging the bar G' on the rock-shaft G. When the lever B' is lifted by the depression of the corresponding key, the pawl $G^2$ is disengaged from the wheel 5, with which it is in normal engagement, and engaged with the wheel 7, said pawl engaging the spaces between the teeth of said wheel, said spaces being arranged opposite to one another.

It will be perceived that when the pawl $G^2$ is released from the wheel 5 the spring 25 will throw the pin 24 to the limit of the slot 23, the pawl $G^2$ at the same time engaging the wheel 7 and holding it from turning. The slot 23 is of a length just sufficient to permit the wheel 5 being rotated by the spring 25 the distance of a single tooth, where the wheel 5 is held from further rotation while the pawl $G^2$ is in engagement with the wheel 7. When the lever B' drops to normal position, the pawl $G^2$ is disengaged from the wheel 7 and reëngaged with the wheel 5, the wheel 5 having meanwhile rotated, as described, the distance of one tooth. The pawl $G^2$, being disengaged from the wheel 7, permits the wheel 7 being rotated by the spring 8 to the limit of the slot 23, or the distance of one tooth, the rotation of the wheel 7 carrying with it a corresponding distance the shaft 4 with the wheel 3 and a toothed wheel 26 on its front end to operate other parts, as will be hereinafter explained. The operation of the wheel 3 carries with it the crank-pawl $I^4$, by means of which the operating-rod $I^2$ is thrown downward to bring the trip-hammer I into retracted position and bring a corresponding tension upon the spring I', said spring and hammer being thus retracted into normal position to be actuated to operate the hammer H. As the pawl I$^4$ is forced downward thus by the rotation of the wheel 3 the spring $i$, retracting the spindle I$^5$, forces the pawl I$^4$ under the arm $i^4$, thereby locking the pawl I$^4$ until the spindle I$^5$ is driven forward by the operation of the bell-crank lever I$^6$, as hereinbefore set forth.

D$^5$, Fig. 7, is a pawl engageable with the pinion D$^3$ on the type-wheel shaft D'. This pawl is fulcrumed, as at $d$, intermediate its ends. With the opposite end of the pawl is engaged a connecting-rod D$^6$, leading rearwardly to and connected with an operating-bar D$^7$, extended, essentially, at right angles thereto, said operating-bar being fulcrumed intermediate its ends, as at $d'$. The opposite extremity of the bar D$^7$ is led adjacent to the pawl I$^4$, so that when the pawl I$^4$ is moved by the spindle I$^5$ out of engagement with the arm $i^4$ the movement thereof will force in corresponding direction the outer extremity of the bar D$^7$, thereby, through the connecting-rod D$^6$, operating the pawl D$^5$ to throw said pawl into engagement with the pinion D$^3$ to lock the type-wheel while being struck by the hammer H. The bar D$^7$ is provided with a tilting dog $d^2$ to allow the pawl I$^4$ to return to normal position. After the pawl I$^4$ has been moved laterally out of engagement with the stop $i^4$, thereby moving the bar D$^7$, said bar returns to normal position before said pawl returns to its normal position. It becomes necessary therefore, inasmuch as the pawl I$^4$ must be moved downward to reëngage under the arm $i^4$, that such a tilting dog should be provided to permit the downward movement of said pawl past said bar. The bar D$^7$ may be returned to normal position in any suitable manner, as by a spring upon the fulcrum-pin $d$. (Shown in Fig. 3.)

J, Figs. 2, 3, and 17, denotes the paper-carriage, comprising a base J', provided with a rack-bar J$^2$, meshing with the toothed wheel 26 upon the shaft 4 and by which the paper-carriage is driven.

J$^3$ and J$^4$ are end pieces of the carriage, in which are journaled a feed-roller J$^5$ and a spring-tension roller J$^6$.

K and K' are bars engaged upon the cover-plate A$^4$, upon which the carriage is supported and upon which the carriage travels, the carriage being provided with rollers $j$, having their tread upon said bars K K'. K$^2$ are adjustable stops on one of said bars.

The bars K K' are provided with elongated guide-recesses $k$ $k'$, Fig. 3, on their adjacent surfaces, into which project lugs $j'$ and $j^2$ to hold the carriage in place. The carriage is provided with rollers J$^7$ and J$^8$ in front of the feed-roller.

J$^9$ is a sheet of cloth or other suitable fabric engaged upon the rollers J$^5$ and J$^6$, said cloth arranged to wind upon the feed-roller when the paper upon which the impression is to be made is inserted, the cloth unwinding at the same time from the roller J$^6$, the spring J$^{10}$ within the roller J$^6$ meanwhile being wound up, thereby increasing the tension of the spring, since the tension of said spring is utilized to wind the cloth back upon the tension-roller to feed the paper upward as the operation of the type-writer proceeds. The cloth passes over the rollers J$^7$ and J$^8$. The cloth is led from the tension-roller under the feed-roller and under the roller J$^8$, thence over the roller J$^7$ and back under and thence about the feed-roller. It will be seen that by this arrangement the rollers J$^5$ and J$^6$ may rotate in opposite directions.

The spring J$^{10}$ winds upon a shaft $j^3$, Fig. 17, within the roller J$^6$. A ratchet-wheel $j^4$ and milled head $j^5$ are engaged upon a spindle 45, engaged with a hub 46, on which said shaft is sleeved, for changing the tension of the spring, a pawl $j^6$ engaging said ratchet-wheel, and the spring being engaged with said hub to permit increasing the tension of the spring while the roller J$^5$ remains stationary. The feed-roller J$^5$ is provided with a hand-knob $j^7$, whereby the roller may be manipulated. The opposite end of the feed-roller is provided with two ratchet-wheels $j^8$ and $j^9$, the latter being rigidly mounted upon the adjacent journal of the roller, while the inner wheel $j^8$ is loosely mounted thereupon.

J$^{11}$, Fig. 15, is a spring exerting its tension upon the ratchet-wheel $j^8$, the spring being provided with a housing J$^{12}$. The ratchet-wheel $j^8$ is provided with an elongated slot $j^{10}$ and the wheel $j^9$ with a stud $j^{11}$, projecting into said slot, said stud made oscillatory and provided with an arm $j^{12}$ on its inner end and with an operating crank-arm $j^{13}$ on its outer end. The wheel $j^9$ is provided with stops $j^{14}$ and $j^{15}$ to limit the movement of said arm. It will be evident that by moving the crank-arm $j^{13}$ to the right or left the arm $j^{12}$ will be thrown either to be brought into position longitudinally of the slot, as shown in dotted lines, Fig. 16, or at right angles thereto, as shown in full lines in said figure, in order to change the width of the spaces between the lines in the operation of writing.

The numeral 27 indicates a pawl, and 28 a laterally-oscillatory lever engaged toward one end upon a reciprocatory spindle 47, a nut on the end of the spindle limiting the movement of the spindle in one direction, the operating-lever 28 compressing the spring, permitting the pawl 27 to engage with the ratchet-wheel $j^8$, said pawl engageable with either of the ratchet-wheels $j^8$ and $j^9$ as the lever 28 is shifted laterally in one direction or the other. Normally the pawl is in engagement with the outer ratchet-wheel $j^9$ and serves to prevent the retraction of the feed-roller. Should it be desired, however, to feed the paper upward the distance of one line to another for the purpose of observing a word or line being written, by throwing inward the lever 28 the pawl is engaged with the ratchet-wheel $j^8$, permitting the ratchet-wheel $j^9$ to retract a distance from one line to another, the retraction being occasioned by the tension-roller $J^6$. Upon releasing the lever 28 the pawl is reengaged with the ratchet-wheel $j^9$, permitting the ratchet-wheel $j^8$ to be retracted by the spring $J^{11}$ the distance from one line to another. If the crank-arm $j^{13}$ is set so as to bring the arm $j^{12}$ at right angles to the length of the slot $j^{10}$, then the ratchet-wheel $j^9$ and the feed-roller may be retracted, upon the engagement of the pawl 27 with the ratchet-wheel $j^8$, the distance of what is ordinarily called a "double space;" but should the arm $j^{12}$ be turned as indicated in dotted lines in Fig. 16 then the feed-roller would be retracted, under these circumstances, a single space. It will be obvious that upon the engagement of the pawl 27 with the ratchet-wheel $j^8$ the wheel $j^9$ would be retracted until the arm $j^{12}$ strikes the limit of the slot in the wheel $j^8$ in whichever direction the arm $j^{12}$ may be turned. When the pawl 27 resumes its normal position in engagement with the wheel $j^9$, the wheel $j^8$ retracts until the arm $j^{12}$ strikes the opposite end of said slot.

A spring 29 allows the lever 28 to yield inwardly and serves also to retract the said lever. In order that the pawl 27 may be operated from either side of the carriage in order to throw up the paper, as above described, the carriage is provided with an additional lever 30, Fig. 1, on the opposite side, the levers 28 and 30 being united by a connecting-rod 31 and fulcrumed in orifices at 52 in arms 53, as shown in Fig. 17. In case it should be desired to retract the feed-roller more than a single or a double space the pawl 27 is provided with an arm 32, by manipulating which the pawl may be thrown entirely out of engagement with both the ratchet-wheels $j^8$ and $j^9$.

To limit the rotation of the feed-roll when the pawl 27 is out of engagement with both of the ratchet-wheels $j^8$ $j^9$, and thereby limit the movement of the cloth in each direction, the feed-roller is provided with a disk 33, provided with a tooth 34. The adjacent end piece $J^4$ of the carriage is provided with a stop-wheel 35, having a limited number of teeth, two teeth being shown in Fig. 14 and three recesses adjacent thereto. The disk 33 and stop-wheel 35 are in the nature of a "Geneva stop."

It will be evident from Fig. 14 that when the disk 33 has rotated so as to bring the tooth 34 into contact with the blank peripheral surface of the stop-wheel 35 the feed-roller will be prevented from rotating any farther in a similar direction. It will also be obvious that should the disk 33 be rotated in a direction opposite that indicated by the arrow the tooth 34 would engage successively with the various recesses of the stop-wheel until the stop-wheel has been turned into a position where the tooth would strike the blank peripheral surface thereof, when the disk 33 would be locked again. In this manner all danger of overwinding the spring in the tension-roller would be effectually prevented should the pawl 27 be entirely disengaged from the ratchet-wheels $j^8$ $j^9$.

Inasmuch as the disk 35 is provided with three recesses to receive the tooth 34, it is evident that the feed-roll may make four revolutions, the tooth 34 entering each of the three recesses, permitting three revolutions of the feed-roll, while said tooth may make one further revolution before it will strike the peripheral surface of the disk 35 and be stopped. It will be evident that with a feed-roll of, say, three inches in circumference four revolutions will wind or unwind a sheet of paper of the length of twelve inches. With a feed-roll of larger diameter a still longer sheet of paper may be wound and unwound thereon, or by providing the disk 35 with a larger number of recesses any desired length of paper may be supplied to the feed-roll and fed therefrom.

Engaged with the knob $j^7$ is provided a device to turn up the paper to bring the line being written into sight, consisting of a disk 36, engaged upon the end of the shaft or journal of the feed-roller, the knob having a limited rotation thereabout independent thereof upon the disengagement of a stop or pin 37 with said knob. The pin is provided with an operating-latch 38. The surface of the knob adjacent to the disk 36 is provided with two lugs or stops 39 and 40 (see Fig. 20) and with an orifice at 41 to receive the pin. The disk 36 has a stationary engagement upon the end of the journal, as by means of a screw 42.

It will be evident that by moving the latch 38 inward toward the disk the pin 37 will be removed from the orifice 41, permitting the knob to rotate until the pin strikes one of the stops. This will throw up the paper, so that the line being written will be in sight. The feed-roller may be rotated back to bring the line into its prior position without feeding the paper past said position by simply reversing the knob until the pin 37 strikes the opposite stop adjacent to the recess 41, when the pin will reënter said recess. A spring 43 retracts the latch 38 into normal position.

Marginal stops are provided at both ends of the machine in the following manner: L and L' represent marginal stop-rods toothed at their outer extremities, as shown. $L^2$ and $L^3$ represent sleeves upon the rods L L', each provided with a bifurcated arm $l$, extending rearward adjacent to the rack-bar $J^2$, as shown at $l'$, and downward, as shown at $l^2$. This bifurcated arm extends under the bar K. The sleeves are provided each with a pawl $l^3$ to engage the toothed portion of the corresponding stop-rod. It will be obvious thus that the sleeves may each be set upon its corresponding stop-rod at any desired point to form a marginal stop at both ends of the machine, the rack-bar J² being provided at its extremities with a stop $j^{16}$ to strike against the arm $l$ to limit the movement of the carriage. The bifurcated arms $l$ are normally in position to be engaged by the stops $j^{16}$ as the carriage moves in one direction or the other. Crank-arms M M' normally hold the bifurcated arms $l$ in such position, said crank-arms normally bearing against the lower portion $l^2$ of the corresponding bifurcated arm. It will be apparent that when the crank-arms M M' are removed from normal position the free ends of the bifurcated arm may drop away from normal position by gravity, the stop-rods L L' being journaled at their ends in brackets $l^4$ upon the rod K, allowing said rods to oscillate in said brackets when the weight of the corresponding arm $l$ is permitted to operate by retraction of the corresponding crank-arm.

The crank-arms M M', Figs. 2, 3, and 4, are engaged upon a transverse shaft M², located on the under side of the cover-plate A⁴. Said shaft is provided at both ends of the machine with operating-levers M³ M⁴, by depressing either of which said crank-arms M M' will be retracted from said bifurcated arms. The shaft M² is provided with a rearwardly-extended arm M⁵, engaged upon one of the arms $g'$ of the rock-shaft G, as by means of a link $m$, embracing said arm of the rock-shaft. It will be evident that when the shaft M² is actuated by depressing either of the levers M³ M⁴ the arm M⁵ will tilt the rock-shaft G. The adjustment of the parts is such as thereby to throw the oscillatory pawl G² entirely out of engagement with the toothed wheels 5 and 7, thereby allowing the carriage to be reciprocated freely in either direction. The crank-arms M M' may be locked in retracted position by means of a latch M⁶, Fig. 4, pivoted at the inner end of the lever M⁴, the inner end of the latch being constructed to wedge under the adjacent portion of the cover-plate as the latch is moved inward, thereby throwing down the corresponding lever M⁴ and holding it down while the latch is so engaged under the cover-plate.

It will be clear that the wheels 3, 5, and 7 can stand still when the carriage is being run back into initial position, as the carriage is only connected with said wheels through the pawl-and-ratchet devices 13 and 14, the pawl riding freely over the ratchet as the carriage is run back. It will also be obvious that if the pawl be lifted from the ratchet-wheel the wheels 3, 5, and 7 will be free to move in either direction.

As already observed, the oscillatory pawl G² is always engaged with the wheel 5 except when a key is depressed, and then it is moved into engagement with the wheel 7 and the wheel 5 is permitted to move one step. The pawl G², however, may be moved out of engagement with both of said wheels 5 and 7 by means of the levers M³ M⁴ acting upon the crank-arm M⁵ and loop $m$ lifting the bar G' into contact with the arm E⁹, and thereby forcing the rod I³ up to hold the crank-pawl I⁴ down out of the way of the wheel 3, said pawl being held thus out of engagement with said wheel until the operator releases the lever M³ or M⁴, when said pawl engages again under the arm $i^4$ in the manner hereinbefore described.

It will be seen that a downward movement is given to the rod I³ by the actuation of the frame E⁶ and its rear arm E⁹, connected with said rod, while by the actuation of the shaft M² by the levers M³ M⁴ an upward movement is given to the said rod I³ for the purpose hereinbefore described.

44 indicates a bar for guiding the paper as it is fed upward against the ribbon upon the periphery of the type-wheel.

N is a shaft supporting paper-guides N' N², sleeved thereupon and made adjustable, set-screws $n$ holding the guides in place upon the shaft. The shaft N is supported at its extremities upon standards N³ N⁴, bifurcated at their lower ends and sprung over the journals of the feed-roller, from which they are removable. The shaft N is connected by a fork P with the yoke H', whereby the shaft N may be tilted over with said yoke. The shaft N is thus made to be tilted over with said yoke in order to insert and remove the paper.

The fork P has a movable engagement with said yoke, as well as a jointed engagement therewith, the yoke being constructed with elongated recesses $h'$, permitting the adjacent end of the yoke to have a reciprocatory movement in said recesses. The fork is constructed with an arm P' normally resting upon the upper surface of the yoke.

The operation of the device will now be understood. The paper is fed into the guides N' N² to the feed-roller, the rotation of which, with the rotation of the tension-roller and the consequent movement of the cloth connected therewith, draws the paper into the machine and rolls it about the feed-roller. The paper is fed upward to the work in the operation of the machine by the tension of the spring in the tension-roller J⁶. The paper may be instantly thrown out of the machine by releasing the pawl 27, which is done by pressing on the arm 32. Should more tension be required or desired upon the hammer for manifolding, it may readily be applied by moving the lever $i^9$ as above described.

When a key is depressed by the operator, the corresponding lever B' is raised against the rocking frames E E' to actuate said frames, whereby the type-wheel is moved into required position. In the further upward movement of the levers B' at the end of the depression of the corresponding key the oscillating frame E⁶ is successively tilted, thereby actuating the mechanism to release the trip-hammer I and permitting it to strike the hammer H. The mechanism holding the trip-hammer in normal position being thus released, the spring 8 actuates the shaft 4 and connected parts. By the same upward movement of the bar B' the rock-shaft G is actuated to move the pawl G², governing the operation of the wheels 5 and 7, and also to manipulate the ribbon-shifting mechanism.

The operation of the shaft 4 accomplishes the movement of the carriage. The spacing mechanism, already described, enables the operator to easily govern the space between the lines, while the carriage may be retracted and governed by the marginal stops, as set forth. The tension of the various springs is readily adjusted as may be required.

48 denotes a metal casing partially surrounding the type-wheel, having a cut-away portion adjacent to the hammer, through which the hammer may strike the type-wheel, the casing serving as a protection to said wheel. The ribbon passes over the exterior face of said case.

49 represents the bell, which may be actuated by the movement of the carriage in any desired manner.

It will be seen that the bar 44 keeps the paper away from the ribbon, while the device 48 keeps the ribbon from the type-wheel.

As shown more particularly in Figs. 13 and 14, the bar 44 is carried by a crank-arm 50, having a jointed engagement upon the adjacent end piece of the carriage, as shown at 51, said crank-arm also carrying the journals of the roller J⁷, by which the bar 44 is permitted to swing up as more paper is rolled into the machine.

The casing 48 is provided with a central spur adjacent to the normal position of the hammer H to guide the operator in adjusting the carriage in required position to strike a given character.

We prefer to construct the rack-bars $e^4$ $e^5$ with their inner teeth, as at $e^8$, longer than the other teeth, so as to more fully insure their taking hold upon the rack-bar upon the type-wheel shaft, the corresponding recess in said rack-bar being also cut deeper. This will secure a more positive action.

It will be observable from Fig. 1 that the fork F⁷ is shifted automatically to the right or left by the filling up of the ribbon upon the spool on either side, whereby the pendulum will be carried past the center of gravity and thus swing over to change the feed of the ribbon.

The design of the lever $i^9$ is to increase the tension of the spring I' for manifolding.

The pawl G² is engaged upon the rock-shaft G by means of a hub G³, provided with an arm $g^2$, Figs. 26 and 27. Upon the said shaft is located an additional hub G⁴, provided with an arm $g^3$. G⁵ and G⁶ are adjusting-screws engaged with the arms $g^2$ $g^3$ to govern the movement of the pawl G² to make the carriage feed faster or slower, as may be required. By means of said adjusting-screws it will readily be seen the position of the pawl G² radially upon the shaft may readily be regulated to govern the throw of said pawl. The hub G³ is sleeved upon the shaft G and is free to turn thereupon, it being prevented from endwise movement by the hub G⁴, keyed to the shaft, and by a collar at the opposite end of the hub G³, also keyed to the shaft, as shown.

It will be observed that the stops $j^{16}$ are rounded on their lower corners, Figs. 21 and 29, and that the upper portion of the arm $l$ is beveled on its upper edge.

When the arm $l$ has been removed out of the path of the carriage by depressing one of the levers M³ M⁴, as hereinbefore described, permitting the writer to write on beyond the normal position of the stop as the carriage moves in one direction, this rounding of the lower corner of the stop and the beveling of the upper edge of the arm $l$ allows the carriage to ride back in the opposite direction, the stop, however, limiting the successive movement of the carriage.

The employment of two frames E E', as hereinbefore described, while permitting a greater throw to each lever B' at the point of contact of the levers with said frames, lessens the required throw of the corresponding key B at its outer end. Thus by uniting the levers B' by links B² with the corresponding keys B and employing two rocking frames located end to end we are enabled to secure the advantages described, together with a lessening of the required throw of the corresponding key. The greater the movement of the rocking frames where the levers B' contact therewith the less nicety of construction is required in the remaining mechanism for operating the type-wheel.

What we claim as our invention is—

1. In a type-writer, the combination with a frame, of oscillatory levers B' having a fulcrumed connection at their rear ends therewith, and keys B fulcrumed intermediate their ends, the rear ends of said keys connected with the forward ends of said levers whereby when a given key is depressed the front end of the corresponding lever will be lifted, substantially as set forth.

2. In a type-writer, the combination with a frame, of a stepped plate C, keys B fulcrumed intermediate their ends upon said plate, and levers B' having a fulcrumed connection at their rear ends with the frame, the rear ends of said keys connected with the front ends of said levers, whereby the front ends of said levers will be lifted by depressing the corresponding key, substantially as set forth.

3. In a type-writer, the combination with a frame, of oscillatory levers B' having a fulcrumed connection at their rear ends with said frame, keys B fulcrumed intermediate their ends, and links B² connecting the rear ends of the keys with the forward ends of the corresponding levers, whereby the front ends of said levers will be lifted when a corresponding key is depressed, substantially as set forth.

4. In a type-writer, the combination of a frame, a rotatable type-wheel, oscillatory levers B' having a fulcrumed connection at their rear ends with said frame, keys B fulcrumed intermediate their ends, and links connecting the rear ends of the keys with the forward ends of said levers, whereby when a given key is depressed the corresponding lever will be lifted and the type-wheel actuated, substantially as set forth.

5. In a type-writer, the combination of a frame, an oscillatory trip-hammer, oscillatory levers having a fulcrumed connection at their rear ends with said frame, and keys fulcrumed intermediate their ends, connected with the forward ends of said levers, whereby when a given key is depressed the corresponding lever will be lifted and the trip-hammer actuated, substantially as set forth.

6. In a type-writer, plural rocking frames E, E' mounted upon separate and independent shafts $E^2$, $E^3$, located end to end and extended in a straight line the one with the other transversely of the machine, each frame constructed with side bars $e$, $e'$ on opposite sides of their respective shafts equidistant at all points from the shaft and oppositely inclined longitudinally from the horizontal plane of the shaft, and underlying key-actuated levers to operate the frames, said frames and shafts separated one from the other at their adjacent ends, whereby each of said frames and shafts may be actuated independently the one of the other and secure greater difference of action between the various keys, substantially as set forth.

7. In a type-writer, the combination of a type-wheel, and two key-actuated rocking frames mounted upon separate and independent shafts located end to end and extending transversely of the machine, said frames and shafts separated one from the other at their adjacent ends and each having side bars on opposite sides of the corresponding shaft, the side bars on one side of each of said frames inclined longitudinally from the horizontal plane of the shafts from the outer extremity of the frames inwardly, and the side bars of said frames inclined from the horizontal plane of the shaft, on the other side, from the inner extremities of the frames outwardly, whereby greater difference of action is secured between the various keys, substantially as set forth.

8. In a type-writer, the combination with a frame, of a type-wheel provided with a rack upon the shaft thereof, oscillatory levers having a fulcrumed connection at their rear ends with said frame, keys fulcrumed intermediate their ends connected with the forward ends of said levers to lift said levers, and two rocking frames located above said levers and actuated thereby, said frames separated the one from the other at their adjacent ends and mounted upon separate and independent shafts located end to end transversely of the machine, whereby greater difference of action is secured between the various keys, each of said frames provided with an independent rack-bar engaging the rack on the type-wheel shaft, substantially as set forth.

9. In a type-writer, the combination of a type-wheel, rocking frames separated one from the other at their adjacent ends and mounted on independent shafts to actuate the type-wheel, oscillatory levers located below the rocking frames to actuate said frames the one independently of the other, and keys arranged to lift said levers into engagement with the corresponding frame when the keys are depressed, substantially as set forth.

10. In a type-writer, an oscillatory frame $E^6$, rocking frames separated the one from the other at their adjacent ends mounted upon independent shafts located end to end within said oscillatory frame, and key-actuated oscillatory levers located below said frames to actuate said frames, the one independently of the other, said rocking frames each constructed with side bars $e$, $e'$ on opposite sides of their respective shafts equidistant from the shafts and oppositely inclined longitudinally from the horizontal plane of the shafts, substantially as set forth.

11. In a type-writer, rocking frames separated one from the other at their adjacent ends mounted upon independent shafts located end to end, an oscillatory frame located upon the shafts of the rocking frames, and key-actuated levers each arranged to first operate one of the rocking frames independently of the other and then to operate said oscillatory frame in one movement of a given lever, said rocking frames each constructed with side bars $e$, $e'$ on opposite sides of their respective shafts equidistant from the shafts and oppositely inclined longitudinally from the horizontal plane of the shafts, substantially as set forth.

12. In a type-writer, a vertically-movable rotatable type-wheel provided with a pinion upon the shaft thereof, rocking frames separated one from the other at their adjacent ends mounted upon independent shafts located end to end, key-actuated oscillatory levers to operate said frames, the one independently of the other, and mechanism to lock the type-wheel in a given position, each of said rocking frames arranged independently of the other to rotate the type-wheel and pinion, said frames each constructed with side bars $e$, $e'$ on opposite sides of their respective shafts equidistant from the shafts and oppositely inclined longitudinally from the horizontal plane of the shafts, substantially as set forth.

13. In a type-writer, the combination of a frame, a rotatable type-wheel, rocking frames separated one from the other at their adjacent ends mounted on independent shafts located end to end, each arranged to rotate the type-wheel independently of the other, and key-actuated oscillatory levers arranged to bear against the under edge of the corresponding frame when the keys are depressed to operate the frames, the one independently of the other, said frames each constructed with side bars $e, e'$ on opposite sides of their respective shafts equidistant from the shafts and oppositely inclined longitudinally from the horizontal plane of the shafts, substantially as set forth.

14. In a type-writer, the combination of a type-wheel, an oscillatory bar to lift the type-wheel, a collar located upon said bar, a sleeve located upon said bar to engage said collar, and a key engaged with said sleeve, substantially as set forth.

15. In a type-writer, the combination of a type-wheel, an oscillatory bar provided with an arm upon which the type-wheel rests, a collar $b^6$ upon said bar, sleeves $b^5$ and $b^7$ upon said bar to engage said collar, and keys engaged with said sleeves, substantially as set forth.

16. In a type-writer, the combination of a type-wheel, an oscillatory yoke, and a reciprocatory hammer carried by said yoke, substantially as set forth.

17. In a type-writer, the combination of a type-wheel, an oscillatory yoke, a reciprocatory self-retracting hammer carried by said yoke, and means at each side of the machine for operating said yoke to turn the hammer into and out of operative position, substantially as set forth.

18. In a type-writer, the combination of a reciprocatory hammer, an oscillatory spring-actuated trip-hammer to strike the reciprocating hammer, a rod $I^2$ connected with said hammer, a laterally-movable rocking pawl $I^4$ engaged with said rod, and means to lock and to release said pawl to lock and release the trip-hammer, the tension of the spring-actuated hammer being increased when in locked position, substantially as set forth.

19. In a type-writer, the combination of an oscillatory trip-hammer, a locking-pawl connected therewith, means to lock said pawl, and a reciprocatory spindle $I^5$ to release said pawl, substantially as set forth.

20. In a type-writer, the combination of an oscillatory trip-hammer, a locking-pawl connected therewith, means to lock said pawl, a reciprocatory spindle to release said pawl and means to actuate said spindle, substantially as set forth.

21. In a type-writer, the combination of an oscillatory trip-hammer, a locking-pawl connected therewith, means to lock said pawl, a reciprocatory spindle to release the pawl, and a bell-crank $I^6$ to actuate said spindle, and a key-actuated oscillatory frame $E^6$ to operate said bell-crank, substantially as set forth.

22. In a type-writer, the combination of an oscillatory trip-hammer, a locking-pawl connected therewith, a rotatable toothed wheel 3 to rock said pawl to put the hammer under tension, and means to lock and to release said pawl, substantially as set forth.

23. In a type-writer, the combination of an oscillatory trip-hammer, an oscillatory locking-pawl connected therewith, a stop to lock said pawl, a rotatable toothed wheel 3 to rock said pawl downward to put said hammer under tension, a reciprocatory spindle carrying said pawl under and out of engagement with said stop, and means to reciprocate said spindle, substantially as set forth.

24. In a type-writer, the combination of an oscillatory trip-hammer, a spindle upon which the hammer is fulcrumed, a spring engaged upon said spindle exerting its tension upon said hammer, a locking-pawl connected with said hammer, means to actuate said pawl to put a tension upon said spring, mechanism to lock and to release said pawl, a ratchet-wheel engaged with said spindle, and an additional pawl engaged with said ratchet-wheel, substantially as set forth.

25. In a type-writer, the combination of a trip-hammer, a spindle upon which said hammer is fulcrumed, a ratchet-wheel upon said spindle, a pawl engaging said wheel provided with an operating-lever, and a segmental bar located adjacent to said lever arranged to hold said lever in a given position and whereby the tension of the spring may be regulated by the movement of the lever, said spindle provided with a milled head, substantially as set forth.

26. In a type-writer, the combination of an oscillatory trip-hammer, a locking-pawl connected therewith, means to lock said pawl, a reciprocatory spindle to release the pawl, a bell-crank $I^6$ to actuate the spindle, and a key-actuated oscillatory frame to operate the bell-crank, and means to limit the movement of the bell-crank, substantially as set forth.

27. In a type-writer, the combination of an oscillatory spring-actuated trip-hammer, a pawl connected therewith, a toothed wheel to actuate said pawl to put the hammer under tension, means to lock and to release the pawl, and key-actuated mechanism to rotate said wheel one notch upon the operation of each key, substantially as set forth.

28. In a type-writer, the combination of a rotatable type-wheel provided with a pinion upon the shaft thereof, a pawl $D^5$ engageable with said pinion, a connecting-rod $D^6$ connected with said pawl, an operating-bar $D^7$ connected with said rod, a movable pawl $I^4$ to actuate said operating-bar and means to actuate said pawl, substantially as set forth.

29. In a type-writer, a tension-roller provided with a spring therewithin upon the shaft thereof, a hub 46 located within the roller, with which said shaft is engaged, a spindle 45 engaged with said hub and extending to the exterior of the roller, and pawl-and-ratchet mechanism engaging the outer end of said spindle whereby the tension of the spring may be governed, substantially as set forth.

30. In a type-writer, a feed-roller having its shaft provided with a hand-knob $j^7$, a disk 36 fixedly engaged upon said shaft, a stop 37 upon said disk engageable with said knob whereby the hand-knob may have a limited movement about the disk independently thereof upon the disengagement of said stop to give a limited movement to said roller, substantially as set forth.

31. In a type-writer, a feed-roller having its shaft provided with a hand-knob $j^7$, a disk 36 fixedly engaged upon the shaft of said roller provided with a stop 37, a latch to operate the stop, said knob provided with lugs 39 and 40, and with an orifice 41 to receive said stop whereby the hand-knob may have a limited movement about the disk independently thereof upon the disengagement of said stop from said knob to give a limited movement to the feed-roller, substantially as set forth.

32. In a type-writer, the combination of a carriage having a toothed rack-bar, stops $j^{16}$ upon the extremities of said rack-bar, marginal stop-rods, sleeves adjustable upon said stop-rods, bifurcated arms connected with said sleeves normally in the path of said stops in the travel of the carriage and out of engagement with the teeth of the rack-bar, and means to hold said arms in normal position and to permit their movement out of normal position, substantially as set forth.

33. In a type-writer, the combination of a carriage provided with a toothed rack-bar having stops $j^{16}$ at the extremities thereof, marginal stop-rods, adjustable sleeves upon said rods carrying bifurcated arms $l$ normally in the path of said stops in the travel of the carriage and out of engagement with the teeth of the rack-bar, and crank-arms M M' to hold said arms in normal position and to permit their movement away from normal position, substantially as set forth.

34. In a type-writer, the combination of a carriage provided with a rack-bar having marginal stops at the extremities thereof, marginal stop-rods, adjustable sleeves upon said rods, arms $l$ carried by said sleeves, a transverse shaft $M^2$ provided with crank-arms M M', and with operating-levers $M^3$ $M^4$ to hold the arms $l$ normally in the path of the marginal stops in the travel of the carriage, substantially as set forth.

35. In a type-writer, the combination of a carriage provided with a rack-bar having marginal stops at the extremities thereof, marginal stop-rods, adjustable sleeves upon said rods, arms $l$ carried by said sleeves, a transverse shaft $M^2$ provided with crank-arms M M', and with operating-levers $M^3$ $M^4$ to hold the arms $l$ normally in the path of the marginal stops in the travel of the carriage, a key-actuated rock-shaft G, and an arm $M^5$ engaging said rock-shaft with the shaft $M^2$, substantially as and for the purpose described.

36. In a type-writer, the combination of a carriage provided with a rack-bar having marginal stops at the extremities thereof, marginal stop-rods, adjustable sleeves upon said rods, arms $l$ carried by said sleeves, a transverse shaft $M^2$ provided with crank-arms M M', and with operating-levers $M^3$ $M^4$ to hold the arms $l$ normally in the path of the marginal stops in the travel of the carriage, and means to lock the arms M M' in retracted position, substantially as and for the purpose set forth.

37. In a type-writer, the combination of a shaft 4 having toothed wheels 5 and 7 mounted thereupon, a rock-shaft G provided with a pawl $G^2$ alternately engageable with said wheels, a carriage provided with a rack-bar having marginal stops, marginal stop-rods, adjustable sleeves upon said rods, arms $l$ carried by said sleeves, a transverse shaft $M^2$ provided with crank-arms M M' and with operating-levers $M^3$ $M^4$ on opposite sides of the machine to hold the arms $l$ normally in the path of the marginal stops in the travel of the carriage, and an arm $M^5$ engaging said rock-shaft with the shaft $M^2$ whereby in depressing either of the levers $M^3$ $M^4$ the pawl $G^2$ will be disengaged from both the wheels 5 and 7 allowing the carriage to be reciprocated freely in either direction, substantially as set forth.

38. In a type-writer, the combination of an oscillatory yoke, a reciprocatory hammer carried thereby, a shaft N provided with paper-guides and connected with said yoke whereby said shaft and the yoke may be simultaneously oscillated, substantially as set forth.

39. In a type-writer, the combination of the reciprocatory and rotatable spindle $I^5$, the wheel 3, a crank-pawl $I^4$ upon said spindle engageable by said wheel, a traveling carriage, and mechanism to hold the said pawl out of the path of said wheel to permit the carriage to move freely upon its track when said pawl is so held out of the path of said wheel, substantially as set forth.

In testimony whereof we sign this specification in the presence of two witnesses.

WILLIAM FREDRICK.
  CHARLES H. NORTON.
  ROBERT J. SIMPSON.

Witnesses:
 O. B. BAENZIGER,
 M. A. MARTIN.